United States Patent
Goodrich

(10) Patent No.: US 10,883,238 B2
(45) Date of Patent: Jan. 5, 2021

(54) GROUNDWATER MANAGEMENT AND REDISTRIBUTION SYSTEMS, AND RELATED METHODS

(71) Applicant: Edward Goodrich, Nags Head, NC (US)

(72) Inventor: Edward Goodrich, Nags Head, NC (US)

( * ) Notice: Subject to any disclaimer, the term of this patent is extended or adjusted under 35 U.S.C. 154(b) by 30 days.

(21) Appl. No.: 16/364,580

(22) Filed: Mar. 26, 2019

(65) Prior Publication Data

US 2020/0308787 A1 Oct. 1, 2020

(51) Int. Cl.
*E02B 1/00* (2006.01)
*C02F 1/00* (2006.01)
*C02F 103/06* (2006.01)

(52) U.S. Cl.
CPC ............ *E02B 1/00* (2013.01); *C02F 1/00* (2013.01); *C02F 2103/06* (2013.01)

(58) Field of Classification Search
CPC .......... E02B 1/00; C02F 1/00; C02F 2103/06
See application file for complete search history.

(56) References Cited

U.S. PATENT DOCUMENTS

| | | | |
|---|---|---|---|
| 3,875,051 A | 4/1975 | Kovarik | |
| 4,228,006 A | 10/1980 | Hanna | |
| 5,114,586 A | 5/1992 | Humphrey | |
| 5,192,426 A | 3/1993 | Decoster et al. | |
| 5,288,412 A | 2/1994 | Voorhees et al. | |
| 5,534,147 A | 7/1996 | Kallenbach et al. | |
| 5,827,010 A * | 10/1998 | Hassett | E03F 1/002 405/36 |
| 5,895,569 A | 4/1999 | Connelly | |
| 5,954,451 A | 9/1999 | Presby | |
| 6,132,138 A * | 10/2000 | Haese | A01N 25/00 405/37 |
| 6,206,612 B1 * | 3/2001 | Meyer | A01C 3/02 137/236.1 |
| 6,270,661 B1 * | 8/2001 | Jowett | C02F 3/046 210/151 |

(Continued)

FOREIGN PATENT DOCUMENTS

| | | |
|---|---|---|
| CN | 1509988 A | 7/2004 |
| CN | 101928097 B | 5/2012 |

(Continued)

*Primary Examiner* — Benjamin F Fiorello
(74) *Attorney, Agent, or Firm* — Myers Bigel, P.A.

(57) ABSTRACT

The present disclosure describes a groundwater management and redistribution system, the system comprising a groundwater source at a first elevation; an inlet line fluidly connecting the groundwater source to a central offsite management and redistribution plant; an outlet line fluidly connecting the management plant to a redistribution tank, wherein the redistribution tank is located at a second elevation; at least one monitoring unit at or adjacent to the redistribution tank and configured to detect and monitor a water table level at the second elevation, wherein the at least one monitoring unit is in communication with the plant and/or the redistribution tank; and a distribution line fluidly connecting the redistribution tank to a distribution area located at the second elevation. Methods of redistributing groundwater and/or treated wastewater to adjust water table levels are also provided.

18 Claims, 3 Drawing Sheets

(56) References Cited

U.S. PATENT DOCUMENTS

| | | | |
|---|---|---|---|
| 6,887,375 B2 | 5/2005 | Johnson | |
| 8,840,789 B2* | 9/2014 | Creffield | C02F 3/208 |
| | | | 210/259 |
| 9,663,935 B2 | 5/2017 | Goodrich | |
| 9,832,939 B2* | 12/2017 | Russell | A01G 25/00 |
| 10,285,345 B2* | 5/2019 | Gong | B08B 9/0856 |
| 2002/0166812 A1 | 11/2002 | Rylander et al. | |
| 2003/0097482 A1* | 5/2003 | DeHart | H04L 67/12 |
| | | | 709/253 |
| 2009/0024369 A1* | 1/2009 | Manglik | E21B 49/00 |
| | | | 703/2 |
| 2010/0224577 A1 | 9/2010 | Ball | |
| 2012/0024766 A1 | 2/2012 | McKinney | |
| 2012/0228117 A1 | 9/2012 | Panunzio | |
| 2013/0078038 A1 | 3/2013 | Potts | |
| 2015/0086389 A1* | 3/2015 | Vert | B01D 21/0018 |
| | | | 417/61 |
| 2015/0127628 A1* | 5/2015 | Rathod | G06F 16/955 |
| | | | 707/710 |
| 2016/0236944 A1* | 8/2016 | Goodrich | C02F 3/2866 |
| 2017/0234289 A1* | 8/2017 | Franck | H02K 7/1823 |
| | | | 290/54 |

FOREIGN PATENT DOCUMENTS

| | | |
|---|---|---|
| CN | 202705187 U | 1/2013 |
| WO | 2014055838 A1 | 4/2014 |

\* cited by examiner

GROUNDWATER MANAGEMENT AND REDISTRIBUTION SYSTEMS, AND RELATED METHODS

FIELD

The invention relates to groundwater management and redistribution systems with decentralized managing and redistributing of groundwater and methods of using the same. The invention further relates to systems and methods of incorporating a groundwater management and redistribution system into an existing wastewater treatment system.

BACKGROUND

Fluctuating water table levels may be a nuisance that homeowners face. As illustrated in FIG. 1, houses that are higher above sea level have a significantly lower water table than houses that are closer to sea level making it more difficult for the houses at the higher elevation to access the water table (e.g., when digging a well). On the other hand, houses near the coast may have the concern about rising water table levels due to rising sea levels or coastal flooding (e.g., when impacted by a hurricane). Higher water table levels can lead to flooding, standing water, septic system failures, and can be detrimental to crops. A system capable of managing and redistributing groundwater to adjust water table levels could be beneficial.

SUMMARY

The present invention relates to a system and method for groundwater management and redistribution of groundwater and/or treated wastewater. The present invention further provides a system and method for incorporating a groundwater management and redistribution system into an existing wastewater treatment system.

A first aspect of the present invention is directed to a groundwater management and redistribution system. The groundwater management and redistribution system may comprise a groundwater source at a first elevation; an inlet line fluidly connecting the groundwater source to a central offsite management and redistribution plant; an outlet line fluidly connecting the management plant to a redistribution tank, wherein the redistribution tank is located at a second elevation; at least one monitoring unit at or adjacent to the redistribution tank and configured to detect and monitor a water table level at the second elevation, wherein the at least one monitoring unit is in communication with the plant and/or the redistribution tank; and a distribution line fluidly connecting the redistribution tank to a distribution area located at the second elevation. The groundwater management and redistribution system may further comprise at least one monitoring unit at or adjacent to the groundwater source.

Another aspect of the present invention is directed to a method for redistributing groundwater to adjust water table levels. The method may comprise transporting the groundwater from a groundwater source at a first elevation through an inlet line to a central offsite groundwater management and redistribution plant; detecting and monitoring a water table level at a second elevation; transporting the groundwater from the plant through an outlet line to a redistribution tank, wherein the redistribution tank resides at the second elevation; and redistributing the groundwater from the redistribution tank through a distribution line to a distribution area adjacent to the redistribution tank located at the second elevation. The method may further comprise detecting and monitoring a water table level at the first elevation.

Another aspect of the present invention is directed to a method of using groundwater and/or treated wastewater to adjust water table levels. The method may comprise transporting wastewater from a wastewater source through an inlet line to a central offsite wastewater treatment plant; treating the wastewater at the wastewater treatment plant to produce treated wastewater; transporting the treated wastewater through an outlet line to a holding tank for treated wastewater; monitoring the water table level at or adjacent to the holding tank; and distributing the treated wastewater through a distribution line from the holding tank into a distribution area adjacent to the holding tank, thereby raising the water table level.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
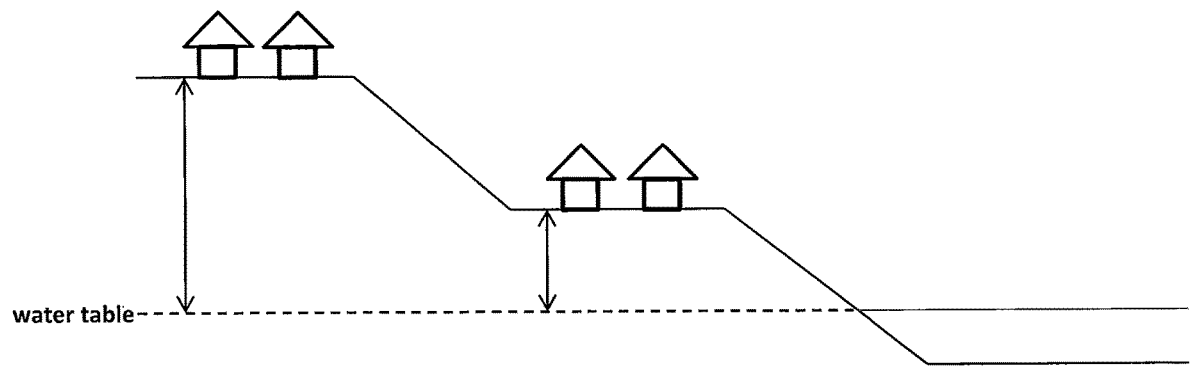
FIG. 1 illustrates the difference in water table levels based on the evaluation above sea level.

The present invention will now be described in more detail with reference to the accompanying drawings, in which preferred embodiments of the invention are shown. In the drawings, the relative sizes of regions or features may be exaggerated for clarity. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a system or method comprises components or steps A, B and C, it is specifically intended that any of A, B or C, or a combination thereof, can be omitted and disclaimed singularly or in any combination.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used in the description of the invention and the appended claims, the singular forms "a," "an," and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as distance or volume, is meant to encompass variations of ±20%, ±10%, ±5%, ±1%, ±0.5%, or even ±0.1% of the specified amount.

The transitional phrase "consisting essentially of" means that the scope of a claim is to be interpreted to encompass the specified materials or steps recited in the claim, and those that do not materially affect the basic and novel characteristic(s) of the claimed invention.

The term "groundwater," as used herein, refers to the water present beneath the Earth's surface in soil pore spaces and in the fractures of rock formations.

The term "water table," as used herein, refers to the depth at which the soil pore spaces or fractures and voids in rock become completely saturated with water.

The term "wastewater" or "sewage," as used herein, refers to water that has been used for bathing, toilets, cooking, dishwashing, clothes washing, etc., or industrial processes that is discharged from residences, commercial buildings, and other structures.

The term "treated wastewater," as used herein, refers to wastewater that has been treated in a manner such that it can be safely used for non-potable purposes, such as irrigation.

Embodiments of the present invention relate to a system and method for managing and redistributing groundwater. Embodiments of the present invention further provide a system and method for incorporating a groundwater management and redistribution system into an existing wastewater treatment system, e.g., a system that that combines the advantages of a wastewater treatment plant with the advantages of managing and redistributing groundwater and/or treated wastewater to raise and/or lower the water table levels at different elevations above sea level. The present invention advantageously provides a system to redistribute groundwater to adjust water table levels at different elevations, reduces concern about the rise of the water table due to rising sea levels, and takes advantage of existing disposal systems.

Thus, one aspect of the invention relates to a groundwater management and redistribution system.

Another aspect of the present invention relates to a method for managing and redistributing groundwater.

A further aspect of the present invention relates to a method of using treated wastewater and/or groundwater to adjust a water table level.

Embodiments of the present invention will now be described in further detail with reference to FIGS. 2-4.

Figure 2:
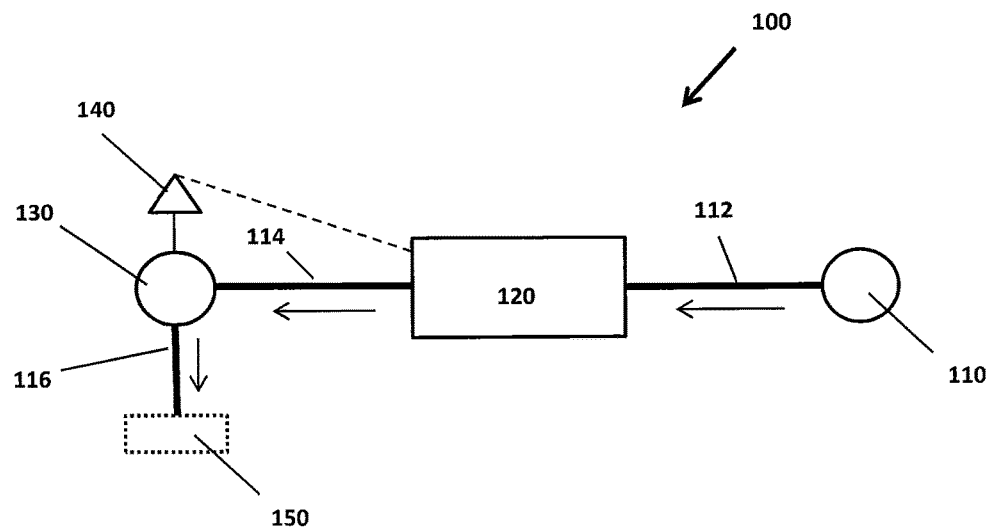
FIG. 2 illustrates a groundwater management and redistribution system according to embodiments of the present invention.
Figure 3:
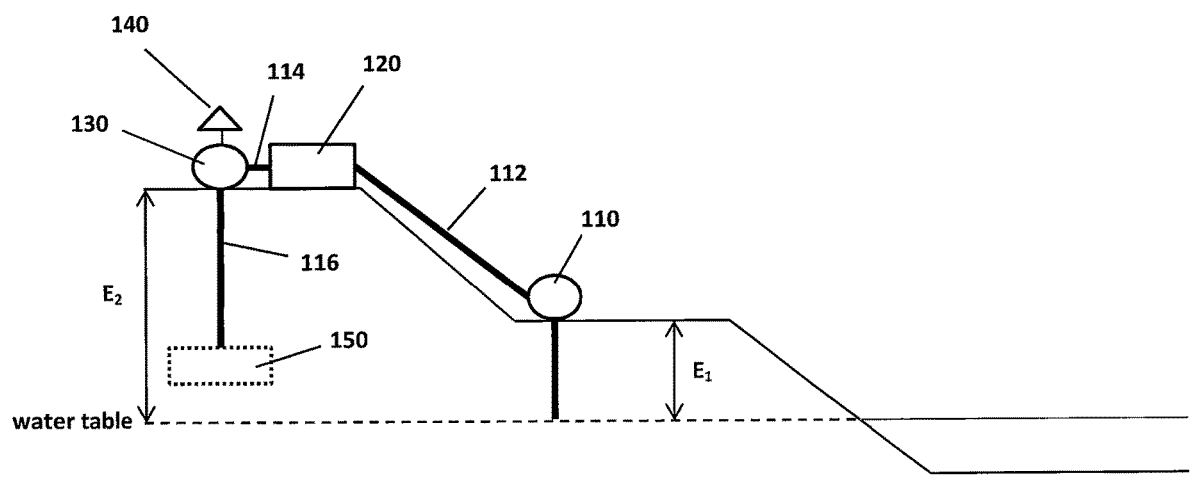
FIG. 3 illustrates an exemplary use of the groundwater management and redistribution system of FIG. 2 at different elevations.

Referring to FIGS. 2-3, a groundwater management and redistribution system 100 is illustrated. The groundwater management and redistribution system 100 includes a groundwater source 110. The groundwater source 110 may be located at a first elevation ($E_1$) above sea level (see, e.g., FIG. 3) and may comprise any structure that can access groundwater. Examples of groundwater sources 110 may include, without limitation, wells, pumps, and the like.

The system 100 includes an inlet line 112 fluidly connecting the groundwater source 110 to a central offsite groundwater management and redistribution plant 120. The system 100 may include multiple groundwater sources 110 all directly or indirectly connected to the plant 120, e.g., 2, 5, 10, 25, 50, 100, 500, 1000, or more groundwater sources 110. Most or all of the groundwater sources 110 within a certain distance of the central offsite groundwater management and redistribution plant 120 may be connected to the plant 120, e.g., most or all of the groundwater sources 110 within 1, 5, 10, 15, 20, 25, or more miles of the plant 120. In some embodiments, the multiple groundwater sources 110 may be located at the same first elevation ($E_1$) above sea level or different elevations (E) above sea level.

The system 100 further includes an outlet line 114 fluidly connecting the management and redistribution plant 120 to one or more redistribution tanks 130. The system 100 may include multiple redistribution tanks 130 all directly or indirectly connected to the groundwater management and redistribution plant 120, e.g., 2, 5, 10, 25, 50, 100, 500, 1000, or more redistribution tanks 130. Most or all of the redistribution tanks 130 within a certain distance of the groundwater management and redistribution plant 120 may be connected to the plant 120, e.g., most or all of the redistribution tanks 130 within 1, 5, 10, 15, 20, 25, or more miles of the plant 120. The amount of groundwater transported to the redistribution tanks 130 may be the same as, more, or less than the amount of groundwater transported to the management and redistribution plant 120 from the groundwater source 110.

The redistribution tank(s) 130 may reside at a second elevation ($E_2$) above sea level that is different than the elevation ($E_1$) where the groundwater source 110 is located. For example, in some embodiments, the redistribution tank(s) 130 may be located at a higher elevation ($E_2$) than the groundwater source 110 (e.g., elevation ($E_1$)) (see, e.g., FIG. 3). In some embodiments, the redistribution tank(s) 130 may be located at a lower elevation than the groundwater source 110. In some embodiments, multiple redistribution tanks 130 may be located at varying elevations (E) above sea level.

The system 100 further includes a distribution line 116 fluidly connecting the one or more redistribution tanks 130 to a distribution area 150. The distribution area 150 is at or adjacent to the redistribution tank(s) 130 (i.e., at the second elevation ($E_2$)). The amount of groundwater released from the redistribution tank(s) 130 into the distribution area 150 may be the same as, more, or less than the amount of groundwater transported to the redistribution tank(s) 130 from the plant 120.

In some embodiments, at least one monitoring unit 140 may be at or adjacent to one or more of the redistribution tanks 130. Each monitoring unit 140 is configured to detect and monitor the water table level where the redistribution tank 130 is located (e.g., the water table level at the second elevation ($E_2$) in FIG. 3). For example, the monitoring unit 140 may be configured to detect and monitor current water table levels, changes in the water table level, and historic water table levels at each respective location. Each monitoring unit 140 is in communication with the groundwater management and redistribution plant 120 and/or their respective redistribution tank 130 and information regarding water table levels can be communicated (e.g., wirelessly) in real-time from the monitoring units 140 to the redistribution tank 130 and/or plant 120.

In some embodiments, at least one monitoring unit 140 may be at or adjacent to one or more of the groundwater sources 110. The monitoring unit(s) 140 may be configured to detect and monitor the water table level at the groundwater source 110 and is in communication with the groundwater management and redistribution plant 120.

The groundwater management and redistribution system 110 of the present invention may be used to raise and/or lower water table levels, for example, by collecting groundwater at one elevation ($E_1$) and redistributing it at another elevation ($E_2$). By way of example, as shown in FIG. 3, in some embodiments, groundwater is collected (e.g., pumped) from a groundwater source 110 at an elevation ($E_1$) close to sea level. The groundwater is transported through the inlet line 112 to the central offsite management and redistribution plant 120 where the groundwater may be stored. As the groundwater is collected from the groundwater source 110, the water table level at the first elevation ($E_1$) is lowered.

The at least one monitoring unit 140 detects and monitors the water table level at a second (higher) elevation ($E_2$) and communicates the water table level to the management and redistribution plant 120. If the water table level drops below a predetermined threshold, groundwater is transported from the plant 120 through the outlet line 114 to the redistribution tank 130 located at the second elevation ($E_2$). The groundwater is transported through one or more distribution lines 116 to one or more distribution areas 150 at the second elevation ($E_2$). The groundwater is absorbed into the ground at the distribution area(s) 150 which raises the water table level at the second elevation ($E_2$). Likewise, if the water table level rises above a predetermined threshold, groundwater may be removed from the elevation (E) (e.g., from a groundwater source 110) and transported to the plant 120 for future redistribution.

In some embodiments, the system 100 may raise and/or lower a water table level in a range of about 0.25 inches to about 0.75 inches per day.

In some embodiments, groundwater has already been transported to and stored at the redistribution tank 130 and the at least one monitoring unit 140 communicates the water table level to the redistribution tank 130 to signal the distribution of groundwater through the distribution lines 116 to the distribution area(s) 150.

In some embodiments, the system 100 of the present invention could be used to preemptively move groundwater from a location with a high water table level to a location with a low water table level, for example, if an area with a high water table level was expecting to receive a large amount of rain (e.g., a hurricane). By preemptively lowering the water table level, the system 100 can help to mitigate flooding and/or standing water that could be caused by excessive rainfall.

Figure 4:
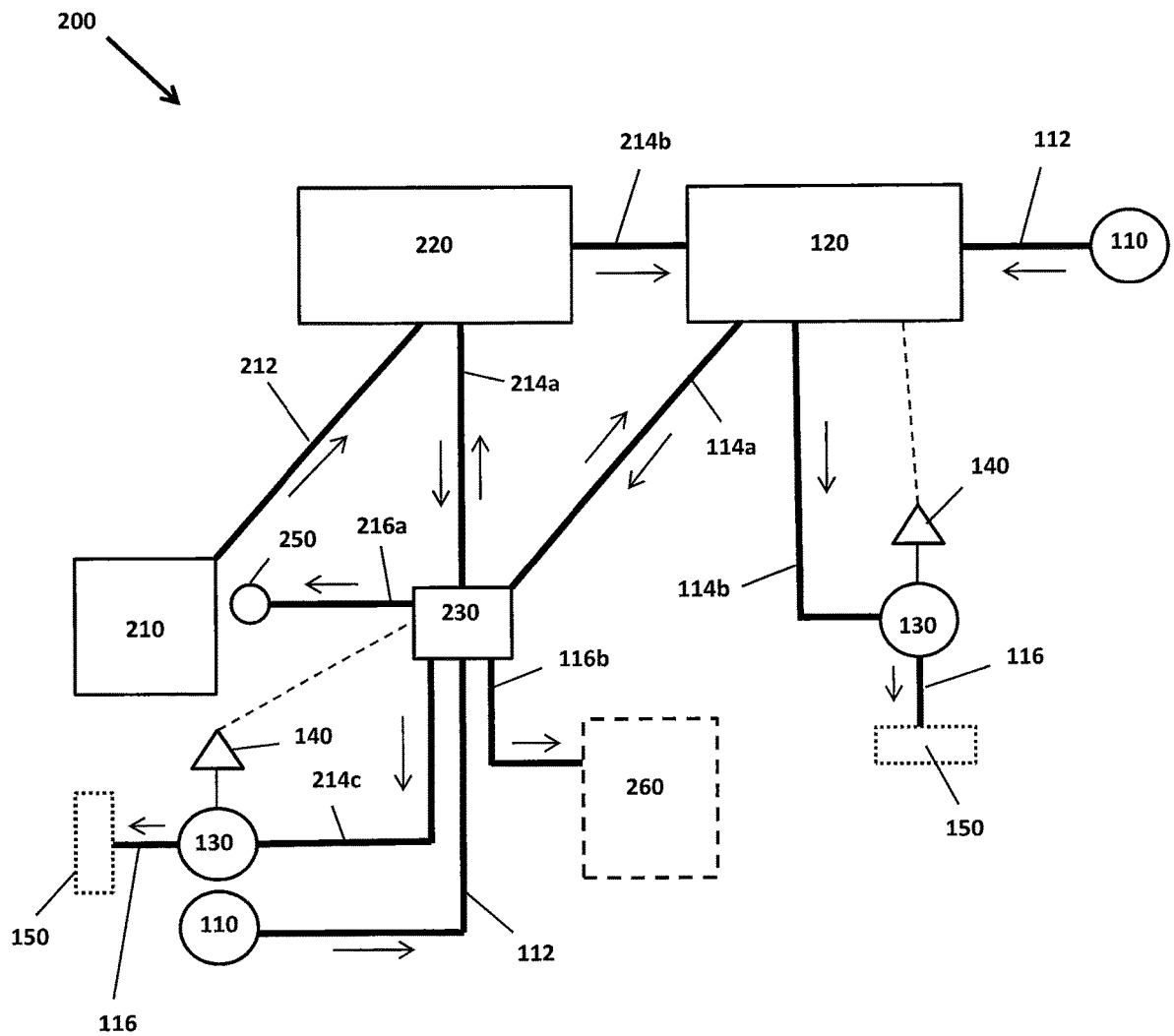
FIG. 4 illustrates the groundwater management and redistribution system of FIG. 2 incorporated into an existing wastewater treatment system according to embodiments of the present invention.

Referring now to FIG. 4, in some embodiments, the groundwater management and redistribution plant 120 may be incorporated into an existing wastewater treatment plant 220 to form a combined system 200. An exemplary wastewater treatment system is described in U.S. Pat. No. 9,663,935 to Goodrich, which is incorporated by reference in its entirety herein.

The wastewater treatment plant 220 may be any type of plant suitable for treating wastewater known in the art. The plants may carry out wastewater pretreatment, primary treatment, secondary treatment, and/or tertiary treatment, and may include one or more processes and mechanisms for sedimentation, filtration, lagooning, removal of nutrients, nitrogen, and/or phosphorus, disinfection, and odor control.

As shown in FIG. 4, wastewater generated at a structure 210 is transported through an inlet line 212 to the wastewater treatment plant 220. The inlet line 212 may be connected directly to the structure 210 or indirectly through a septic tank or storage tank that collects the wastewater from the structure 210. The solids in the wastewater may be separated in the septic tank or storage tank and only the liquid wastewater is transported to the wastewater treatment plant. At the wastewater treatment plant 220 the wastewater is treated using techniques known in the art to produce treated wastewater (i.e., reclaimed water). The treated wastewater is then transported either through outlet line 214a to a holding tank for treated wastewater 230 which is located at or adjacent to the wastewater source (i.e., structure 210) or through outlet line 214b to the groundwater management and redistribution plant 120.

In some embodiments, groundwater may also be transported to the holding tank 230 from the groundwater management and redistribution plant 120 through outlet line 114a.

The amount of treated wastewater transported to the holding tank 230 may be the same as, more, or less than the amount of wastewater transported to the wastewater treatment plant 220 from structure 210. Similarly, the amount of groundwater transported to the holding tank 230 may be the same as, more, or less than the amount of groundwater transported to the central offsite management plant 120 from the wastewater treatment plant 220 and/or the groundwater source 110.

In some embodiments, the holding tank 230 may be fluidly connected to a redistribution tank 130 through an outlet line 214c. Like discussed above, the treated wastewater and/or groundwater in the redistribution tank 130 may be distributed through one or more distribution lines 116 into a distribution area 150.

In some embodiments, the wastewater treatment plant 220 may be fluidly connected to a redistribution tank 130 through a separate outlet line 214. Treated wastewater may be transported through the outlet line 214 directly to the redistribution tank 130 (i.e., bypassing the holding tank 230) without the need for a central offsite management plant 120. Thus, in some embodiments, the wastewater treatment plant 220 takes the place of the central offsite management plant 120.

The groundwater and/or treated wastewater in the holding tank 230 may also be distributed through one or more alternate distribution lines 216 to one or more treated wastewater use recipients. The treated wastewater and/or groundwater in the holding tank 230 may be distributed through the distribution lines 216a to an irrigation system, e.g., through an irrigation pump 250 so that the treated wastewater is used to irrigate a lawn and/or landscaping at or adjacent to the structure 210, e.g., using sprinklers, drip hoses, or other irrigation devices. The treated wastewater and/or groundwater in the holding tank 230 may be transported to the structure 210 for non-potable uses, such as operating toilets. The treated wastewater in the holding tank 230 may be used for other activities at or adjacent to the structure 210, such as car washing, power washing the structure 210 or other items, and filling fountains or other water features. The groundwater and/or treated wastewater in the holding tank 230 may also be transported through a distribution line 216b to a drainfield or leachfield 260 located at or adjacent to the structure 210.

The holding tank 230 may comprise multiple outlet lines 214c and/or distribution lines 216 so that the groundwater and/or treated wastewater may be transported to multiple recipients, either simultaneously or at different times. In certain embodiments, the groundwater and/or treated wastewater in the holding tank 230 is distributed to various redistribution tanks 130 or use recipients as needed and is transported to the drainfield or leachfield 260 only when the groundwater and/or treated wastewater amount in the holding tank 230 exceeds a specified amount. Such distribution may be controlled by, for example, a float switch assembly in the holding tank 230.

In some embodiments, the system 200 may also be used to control or manipulate the groundwater table level. For example, in some embodiments, the outlet lines 114a, 214a may be configured to reverse flow and pump a volume of groundwater or treated wastewater from the holding tank 230 back to the wastewater treatment plant 220 or the groundwater management and redistribution plant 120. In some embodiments, the holding tanks 230 may comprise additional outlet lines that are configured to pump a volume of groundwater or treated wastewater from the holding tank 230 back to the wastewater treatment plant 220 or the groundwater management and redistribution plant 120. This water can be treated, if required, then redistributed to other holding tanks 230 within the redistribution area that have a low groundwater table, or to other groundwater recipients within the redistribution area. As a result, the groundwater table in those areas with high groundwater table levels will be lowered in an amount equal to the amount being redistributed (i.e., equal to the volume of groundwater or treated wastewater pumped from the holding tank 230 back to the wastewater treatment plant 220 or to the groundwater management and redistribution plant 120). In some embodiments, a pump (not shown) may be installed at each holding tank 230 to pump the water to the respective plant 120, 220. In some embodiments, a water level monitoring device (e.g., monitoring unit 140) may also be installed at each holding tank 230. Additional groundwater level monitoring devices may also be installed in other critical areas within the redistribution area of the system 200.

The outlet lines 112, 212, the inlet line 114, 214, and the distribution lines 116, 216 may be any type of fluid flow path and includes one or more of pipes, tubes, adapters, fittings, pumps, and valves. Transport of wastewater and treated wastewater though the lines may be carried out by any method known in the art, and may include one or more of pressurized force, vacuum force, and gravity. The outlet lines 112, 212, the inlet lines 114, 214, and the distribution lines 116, 216 may be configured to control flow rate and/or direction of the wastewater and/or treated wastewater, e.g., through the use of valves, pumps, and controllers. The outlet lines 112, 212, the inlet lines 114, 214, and/or the distribution lines 116, 216 may comprise one or more flow meters to measure the amount of groundwater, wastewater, or treated wastewater passing through the lines.

The redistribution tanks 130 and holding tank 230 may be made of concrete, plastic, or any other suitable material, and may be of any suitable size sufficient to hold groundwater and/or treated wastewater, e.g., about 500, 1000, 2000, 5000, or 10000 gallons or more.

The redistribution tanks 130 and holding tank 230 may further be fitted with lines to receive, hold, and distribute water in addition to groundwater and treated wastewater. Examples include, without limitation, storm water, e.g., collected from gutters or rain barrels on the structure 210, swimming pools, fountains, and other water features.

The combined system 200 may be one that is newly built, e.g., at the same time as wastewater sources and redistribution tanks are built. In other embodiments, the combined system 200 is built by converting a preexisting wastewater treatment system to include the systems of the present invention. The conversion may be carried out by replacing an existing treated wastewater holding tank 230 or retrofitting an existing tank to convert it to a groundwater and treated wastewater holding tank 230. The system is then established by connecting an inlet line 114a from the offsite management plant 120 the holding tank 230, connecting an outlet line 214c from the holding tank 230 to a redistribution tank 130, and connecting a distribution line 116 from the redistribution tank 130 to a distribution area 150.

It will be understood by those of skill in the art that numerous and various modifications can be made without departing from the spirit of the present invention. Therefore, it should be clearly understood that the forms of the present invention are illustrative only and are not intended to limit the scope of the present invention.

All publications, patent applications, patents, patent publications, and other references cited herein are incorporated by reference in their entireties for the teachings relevant to the sentence and/or paragraph in which the reference is presented.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A groundwater management and redistribution system, the system comprising:
a groundwater source at a first elevation;
an inlet line fluidly connecting the groundwater source to a central offsite management and redistribution plant;
an outlet line fluidly connecting the management plant to a redistribution tank, wherein the redistribution tank is located at a second elevation;
at least one monitoring unit at or adjacent to the redistribution tank and configured to detect and monitor a water table level at the second elevation, wherein the at least one monitoring unit is in communication with the plant and/or the redistribution tank; and
a distribution line fluidly connecting the redistribution tank to a distribution area located at the second elevation.

2. The system of claim 1, wherein the groundwater source is at a lower elevation than the distribution area in relation to sea level.

3. The system of claim 1, wherein transport of groundwater through the outlet line and/or inlet line and/or distribution line is controlled by pressurized force, gravity, and/or vacuum.

4. The system of claim 1, wherein the outlet line and/or inlet line and/or distribution line comprises one or more pumps, valves, and/or flow meters.

5. The system of claim 1, wherein the central offsite management plant is fluidly connected to a wastewater treatment plant.

6. The system of claim 5, wherein the outlet line is a first outlet line fluidly connected to a holding tank from the wastewater treatment plant, the system further comprising a second outlet line fluidly connecting the holding tank to the redistribution tank.

7. The system of claim 5, wherein the wastewater treatment plant is fluidly connected to the redistribution tank.

8. The system of claim 1, further comprising at least one monitoring unit at or adjacent to the groundwater source.

9. A method for redistributing groundwater to adjust water table levels, the method comprising:
transporting the groundwater from a groundwater source at a first elevation through an inlet line to a central offsite groundwater management and redistribution plant;
detecting and monitoring a water table level at a second elevation;
transporting the groundwater from the plant through an outlet line to a redistribution tank, wherein the redistribution tank resides at the second elevation; and
redistributing the groundwater from the redistribution tank through a distribution line to a distribution area adjacent to the redistribution tank located at the second elevation.

10. The method of claim 9, wherein redistribution of the groundwater to the distribution area occurs when the water table level is detected below a predetermined threshold.

11. The method of claim 9, further comprising detecting and monitoring the water table level at the first elevation.

12. The method of claim 11, wherein the transporting of groundwater from the ground source occurs when the water table level is detected above a predetermined threshold.

13. The method of claim 11, wherein the water table level at the first and/or second elevation is raised or lowered in a range of about 0.25 inches to about 0.75 inches per day.

14. The method of claim 9, wherein the groundwater source is at a lower elevation than the distribution area in relation to sea level.

15. The method of claim 9, further comprising transporting treated wastewater from a wastewater treatment plant to the central offsite management plant.

16. The method of claim 15, further comprising transporting the groundwater from the wastewater treatment plant through an outlet line to a holding tank, wherein the holding tank is fluidly connected to the redistribution tank through a second outlet line.

17. The method of claim 9, wherein the water table level at the first elevation is lowered and the water table level at the second elevation is raised.

18. A method of using groundwater and/or treated wastewater to adjust water table levels, the method comprising:
transporting wastewater from a wastewater source through an inlet line to a central offsite wastewater treatment plant;
treating the wastewater at the wastewater treatment plant to produce treated wastewater;
transporting the treated wastewater through an outlet line to a holding tank for treated wastewater;
monitoring the water table level at or adjacent to the holding tank;
distributing the treated wastewater through a distribution line from the holding tank into a distribution area adjacent to the holding tank, thereby raising the water table level; and
transporting groundwater from the central offsite management plant through an outlet line to the holding tank, wherein the groundwater and/or the treated wastewater is distributed through the distribution line into the distribution area.

* * * * *